T. M. FERGUSON.
Sealing Fruit Cans.
No. 80,401. Patented July 28, 1868.
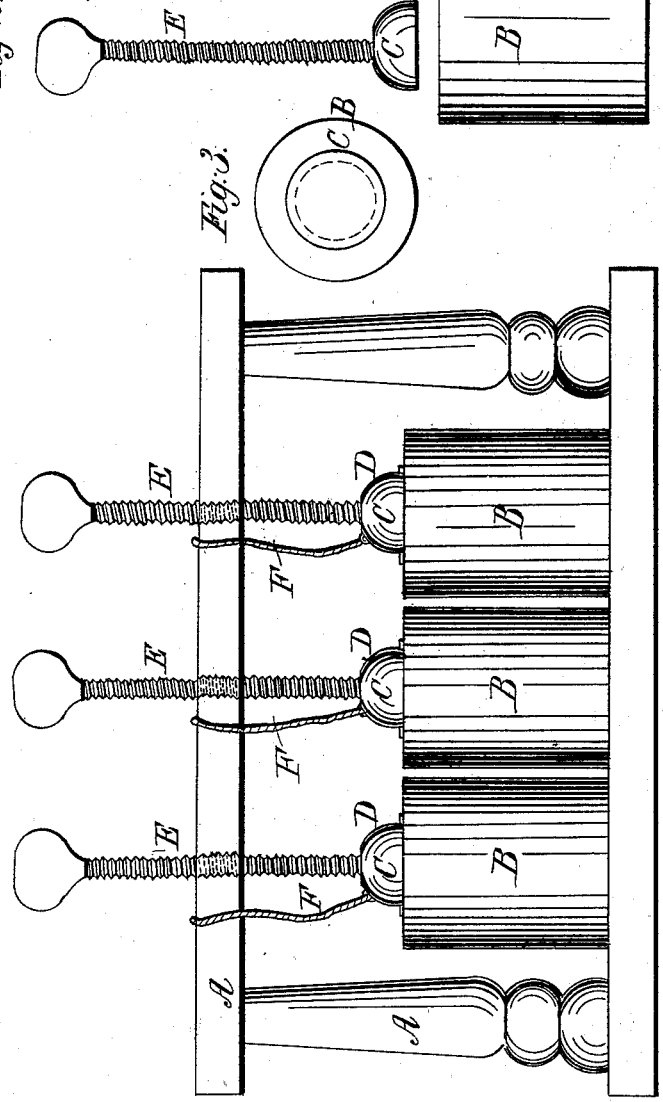

United States Patent Office.

T. M. FERGUSON, OF RAINSBOROUGH, OHIO.

Letters Patent No. 80,401, dated July 28, 1868.

IMPROVED APPARATUS FOR SEALING FRUIT-CANS.

*The Schedule referred to in these Letters Patent and making part of the same.*

TO ALL WHOM IT MAY CONCERN:

Be it known that I, T. M. FERGUSON, of Rainsborough, Highland county, and State of Ohio, have invented a new Mode of Holding and Sealing Air-Tight Cans; and I do hereby declare the following to be an exact description thereof, reference being had to the accompanying drawings, and to the letters of reference marked thereon, making a part of this specification, in which—

Figure 1 represents a side elevation of the machine for holding the lids of air-tight cans until closely soldered.

Figure 2 shows the position of the screw and press-block.

Figure 3 shows the top lid of a can.

The nature of my invention consists in expelling the small quantity of air remaining after heating the cans and before sealing, by pressing the elastic cover of the jar down upon the contents of the cans, and holding there until the operation of sealing is completed, and this is done by means of the devices hereinafter described.

A represents the frame; B B, the cans; C C, the lids of the cans; D D, the semispherical press-blocks that are placed upon each lid C; and the thumb-screws E E above, that are supported by the top piece of the frame A, are screwed down upon each block D, that presses the lid C closely and tightly upon the top of the can, and holds the lid C air-tight, ready for soldering fast around its edges, and facilitates the operation of sealing and soldering the lids completely air-tight. The block C is held by a chain, F, to the top of the frame A.

What I claim as my invention, and desire to secure by Letters Patent, is—

The press-blocks D, thumb-screws E, and frame A, when used for producing a vacuum in fruit-cans, as and for the purpose described.

T. M. FERGUSON.

Witnesses:
JAMES W. GEORGE,
HARRISON W. ROADS.